United States Patent [19]

Beswick et al.

[11] Patent Number: 4,856,640

[45] Date of Patent: Aug. 15, 1989

[54] STOPPER ELEVATOR CONVEYOR

[75] Inventors: Frank Beswick, Phoenixville; Robert W. Winship, Downingtown, both of Pa.

[73] Assignee: The West Company, Phoenixville, Pa.

[21] Appl. No.: 76,777

[22] Filed: Jul. 17, 1987

[51] Int. Cl.$^4$ ............................................. B65G 47/18
[52] U.S. Cl. ................................. 198/311; 198/307.1; 198/526; 198/529; 198/533; 198/535; 198/769; 198/771
[58] Field of Search ...................... 198/301, 306, 307.1, 198/308.1, 311, 526, 527, 529, 531, 533, 534, 535, 540, 542, 543, 544, 547, 549, 550.5, 550.7, 550.9, 550.11, 550.13, 566, 567, 502.2, 443, 444, 728–730, 699, 752, 761, 769, 771

[56] References Cited

U.S. PATENT DOCUMENTS

| | | | |
|---|---|---|---|
| 2,896,771 | 7/1959 | Mecham | 198/311 |
| 3,087,603 | 4/1963 | Petrea | 198/769 X |
| 3,123,889 | 3/1964 | Watts et al. | 198/526 X |
| 3,223,964 | 12/1965 | Stadlin | 198/502.2 X |
| 3,305,067 | 2/1967 | Mayer | 198/443 X |
| 3,338,385 | 8/1967 | Sage | 198/771 |
| 3,391,472 | 7/1968 | Landers | 198/549 X |
| 3,498,483 | 3/1970 | Meharry | 198/311 X |
| 3,499,519 | 3/1970 | Belk et al. | 198/533 X |
| 3,578,094 | 5/1971 | Henry et al. | 198/444 X |
| 3,621,981 | 11/1971 | Nimmo, Jr. et al. | 198/529 X |
| 3,724,656 | 4/1973 | Sterling | 198/443 X |
| 3,730,386 | 5/1973 | Monsees | 198/444 X |
| 4,588,069 | 5/1986 | Sticht | 198/443 |
| 4,655,341 | 4/1987 | Forslund | 198/771 |

FOREIGN PATENT DOCUMENTS 3321296 12/1984 Fed. Rep. of Germany ... 198/550.5

Primary Examiner—Robert J. Spar
Assistant Examiner—Lyle K. Kimms
Attorney, Agent, or Firm—Eugene E. Renz, Jr.

[57] ABSTRACT

A device for transferring small discrete objects such as pharmaceutical stoppers andn caps including a frame movably positionable at a predetermined location for delivery of the objects and an angularly displaced conveyor on the frame having a discharge chute at the predetermined location for discharge in objects thereto. The conveyor includes a conveyor chain apparatus defining a path from a transfer point to the discharge chute. The chain has bucket flight apparatus for conveying the objects along the path. A delivery chute is also on the frame for transferring the objects to the transfer point. The delivery chute includes a first tray inclined with the horizontal and having an open lower terminal end adjacent the transfer point positioned to feed the objects to the conveyor chain. The delivery chute further includes a second tray located within the first tray at the same or greater angle with the horizontal and positioned to receive the objects. The second tray has an open lower terminal end for feeding the objects to the first tray. The delivery chute further includes vibrating apparatus for oscillating both of the trays to impart movement of the objects toward the lower terminal ends of the tray. Finally, a hopper apparatus is provided, which is removably mounted on said frame for holding a quantity of the objects. The hopper apparatus includes a hopper chute for gravity feed of the objects to the delivery chute.

34 Claims, 4 Drawing Sheets

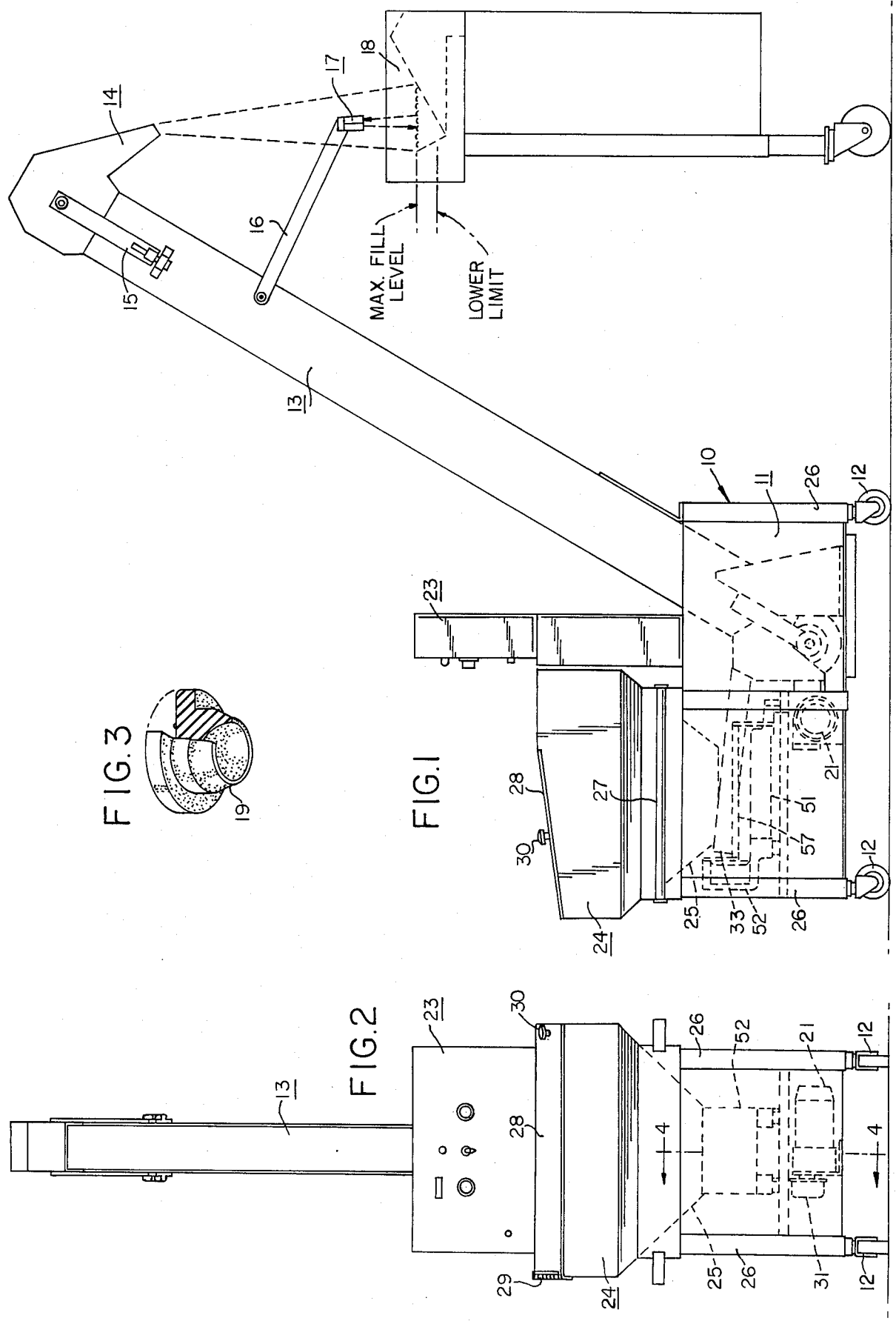

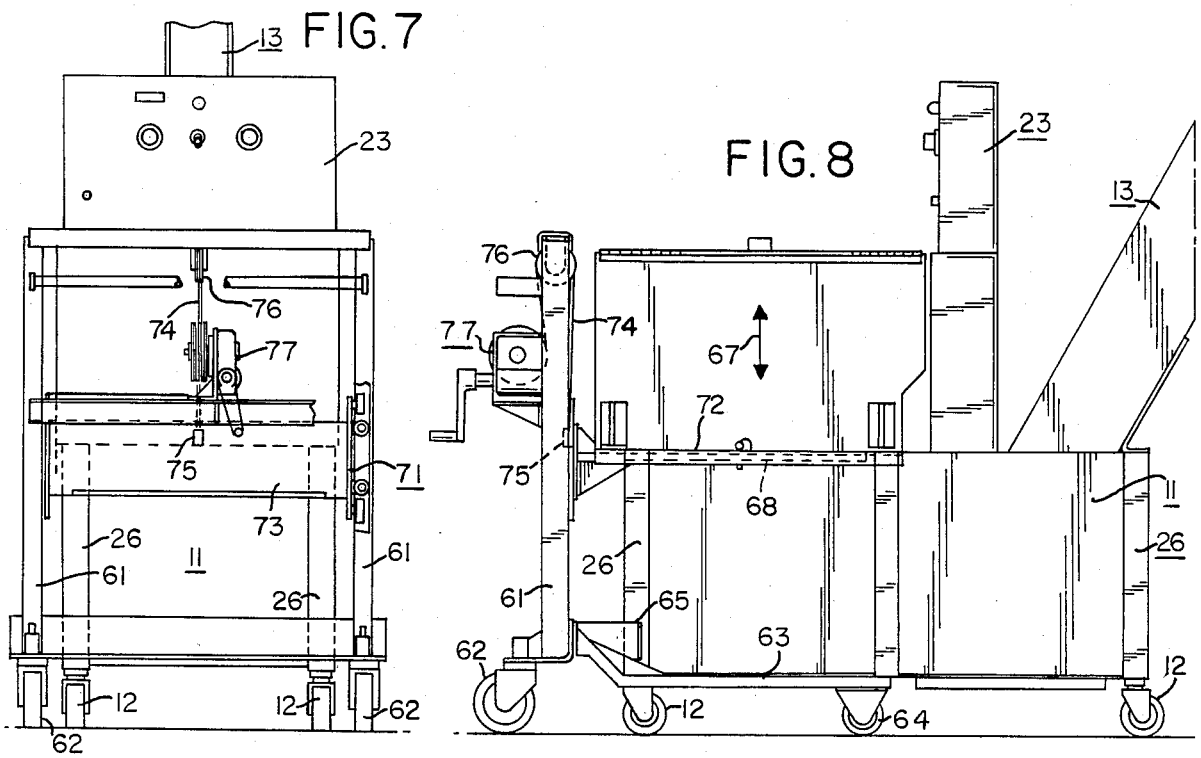
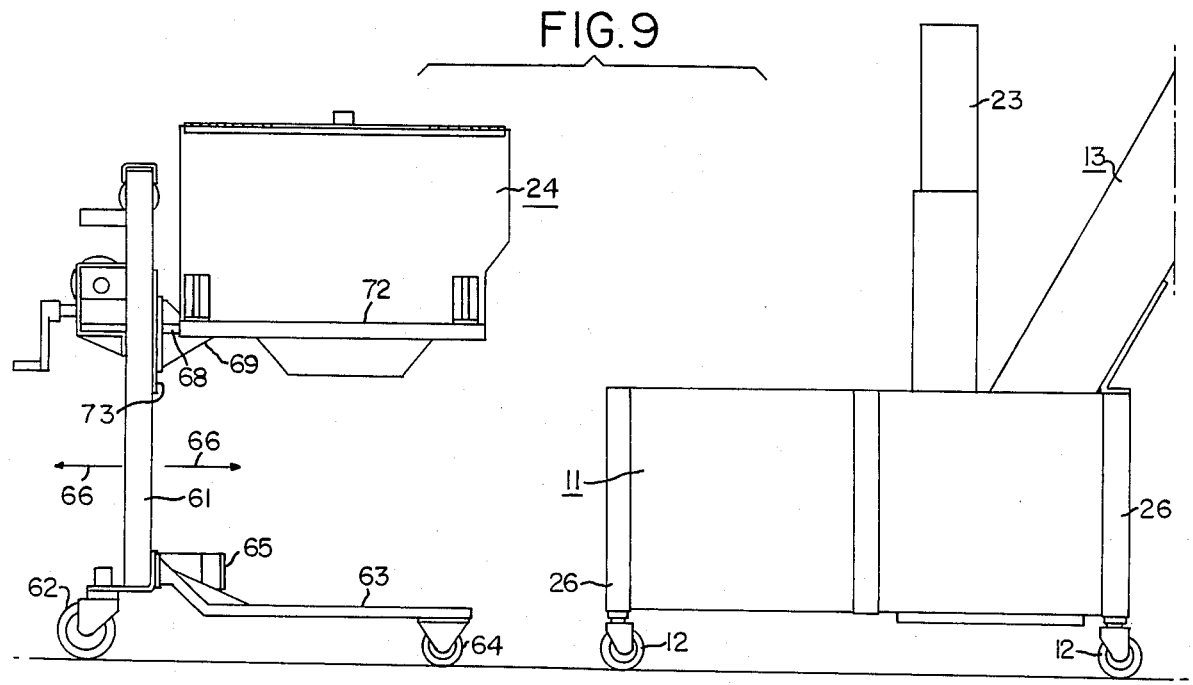
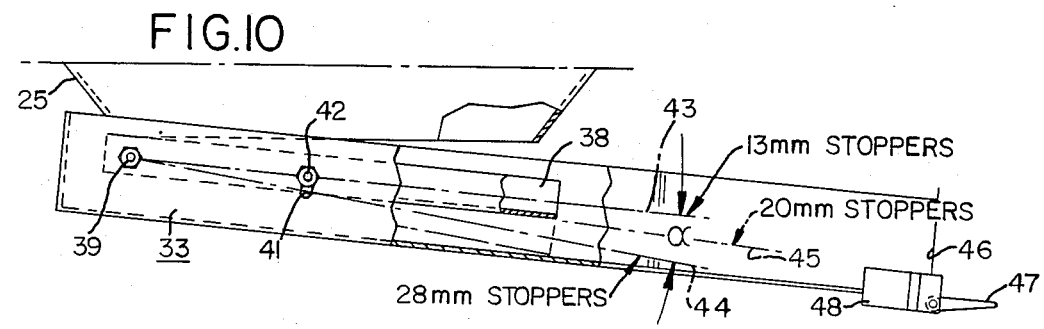

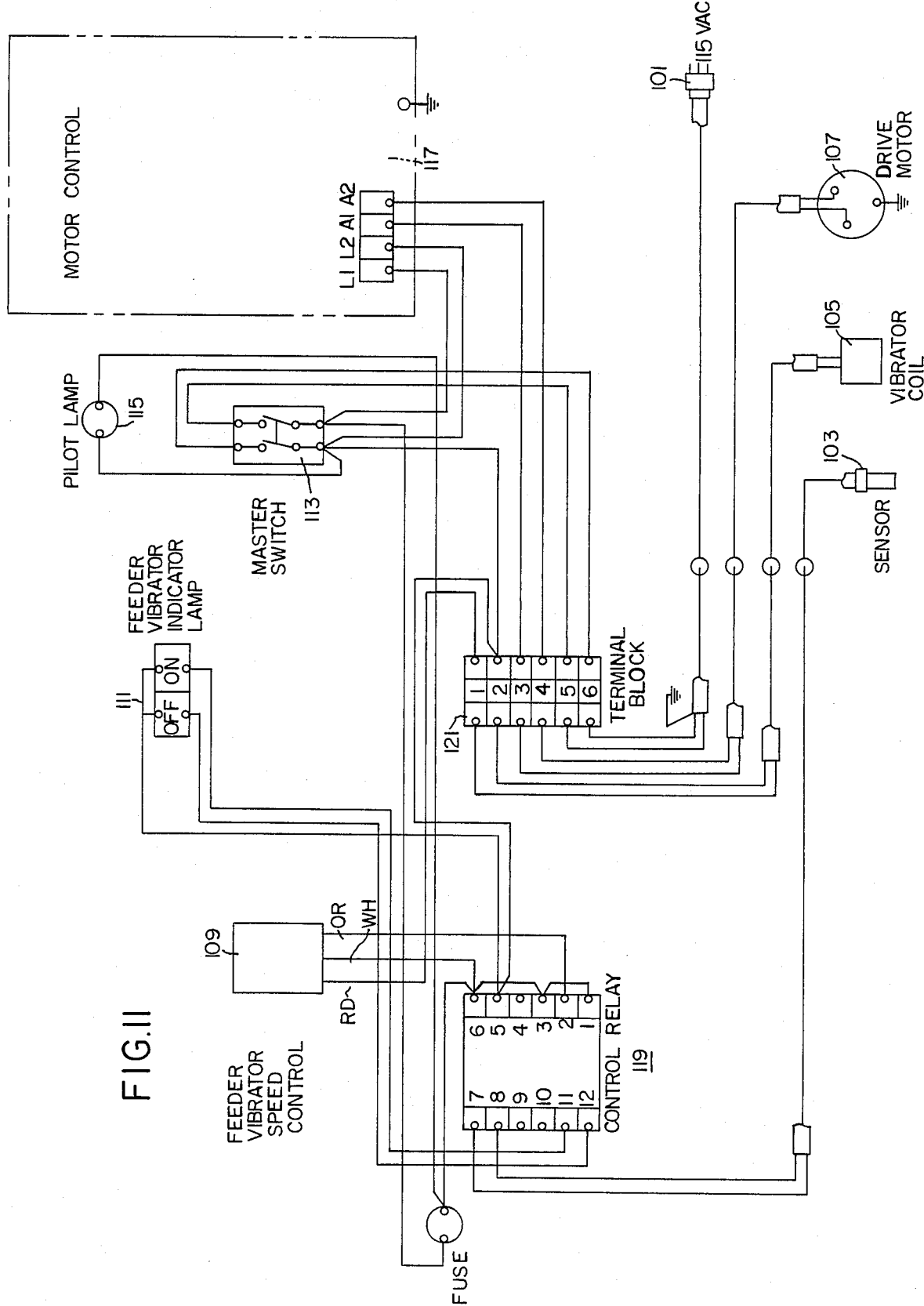

STOPPER ELEVATOR CONVEYOR

FIELD OF THE INVENTION

The present invention relates to a stopper elevator conveyor. The device of this invention is suitable for transferring sterilized stoppers for pharmaceutical containers from a source of sterilized stoppers to a bottle capping machine. It is also suitable for transferring other small discrete objects such as bottle caps and other products of like kind.

BACKGROUND OF THE INVENTION

Elevators, for stoppers and caps for pharmaceutical products as well as for other small discrete products, are designed to transfer these objects to additional equipment such as capping machines and the like. They are designed for high-speed automated assembly processes and, in the pharmaceutical industry particularly, a great concern for sterile working conditions is noted. Elevators are used because in many instances the following equipment using these small discrete objects employs gravity feed and gravity transfer mechanism as the caps or other objects are combined with other parts in the total assembly process.

In addition to the need for extremely sterile conditions in the pharmaceutical industry, it is also necessary that elevators of this type operate efficiently and rapidly. It is well known that the rate of production in automatic assembly is a major factor in the economics of such production. A simple, efficient, rapid delivery system which is capable of transferring small discrete objects such as bottle caps or stoppers to an elevated position for depositing in further processing equipment is needed.

Often times the small discrete objects which are being transferred by such an elevator device come directly from sterilizing means which provide a totally sanitary and sterile product. The operating elevator should then be capable of functioning in a sterile room and should be capable of being refilled easily and quickly to continue production without interruption.

At the present time, a fully automatic, versatile, economical and dependable stopper elevator for the pharmaceutical industry is not available. Accordingly, it is an object of this invention to provided an efficient operating device for transferring small discrete objects such as pharmaceutical stoppers and caps in a manner which is more reliable and efficient than has heretofore been possible.

SUMMARY OF THE INVENTION

Accordingly, it has now been discovered that the above and other objects of the present invention can be accomplished in the following manner. Specifically, the present invention provides for a device for transferring small discrete objects such as pharmaceutical stoppers and caps. The device includes a frame which is movably positionable at a predetermined location for delivery of the objects to an additional piece of equipment for further processing. Typically, this additional piece of equipment would be a capping machine of some type, although the invention is not limited to use with capping machines.

An angularly displaced conveyor is mounted on the frame and has a discharge chute at the predetermined location for discharging the objects, such as into a capping machine or the like. The conveyor includes a conveyor chain means defining a path from a transfer point to the discharge chute. The chain has bucket flight means for conveying objects along that predetermined path.

The device further includes a delivery chute on the frame for transferring the objects to the transfer point so that the objects may be picked up by the bucket flight means and conveyed along the path. The delivery chute includes a first tray which is inclined with the horizontal and has an open lower terminal end adjacent that transfer point so as to feed the objects to the conveyor chain. The delivery chute further includes a second tray which is located within first tray and is positioned at the same or greater angle with respect to the horizon and is positioned to receive the discrete objects. This second tray has an open lower terminal end for feeding objects to the first tray. The delivery chute further includes a vibrating means for oscillating the trays to impart movement of the objects toward the lower terminal ends of both trays.

The device of the present invention further includes a hopper means which is removably mounted on the frame. The hopper means is adapted to hold a quantity of the objects and includes a hopper chute for gravity feeding the objects to the delivery chute and feeding the objects on the second tray.

BRIEF DESCRIPTION OF THE DRAWINGS

These and other objects of the present invention and the various features and details of the operation and construction thereof are hereinafter more fully set forth with reference to the accompanying drawings, wherein:

FIG. 1 is a side elevational view of a stopper elevator conveyor, showing certain details of construction and delivery in conjunction with an adjacent stopper feeder mechanism of an unassociated bottle capping machine.

FIG. 2 is an end elevational view of the device of FIG. 1 as viewed from the left hand side of the operators position.

FIG. 3 is a perspective view, enlarged, of a typical rubber stopper that may be supplied to conveyor hoppers and delivered under controlled and sterile conditions.

FIG. 7 is an end elevational view similar to FIG. 2, showing a modification of the device shown in FIG. 1.

FIG. 8 is a fragmentary side elevational view of the device illustrated in FIG. 7, showing additional details of the modified construction.

FIG. 9 is a side elevational view of the modification illustrated in FIG. 7 and FIG. 8, in use.

FIG. 10 is an enlarged fragmentary side elevational view of the vibratory feeder chute and its associated angularly displaceable feeder trays.

FIG. 11 is an electrical schematic of the device shown in FIG. 1.

DETAILED DESCRIPTION OF THE PREFERRED EMBODIMENT

Figure 5:
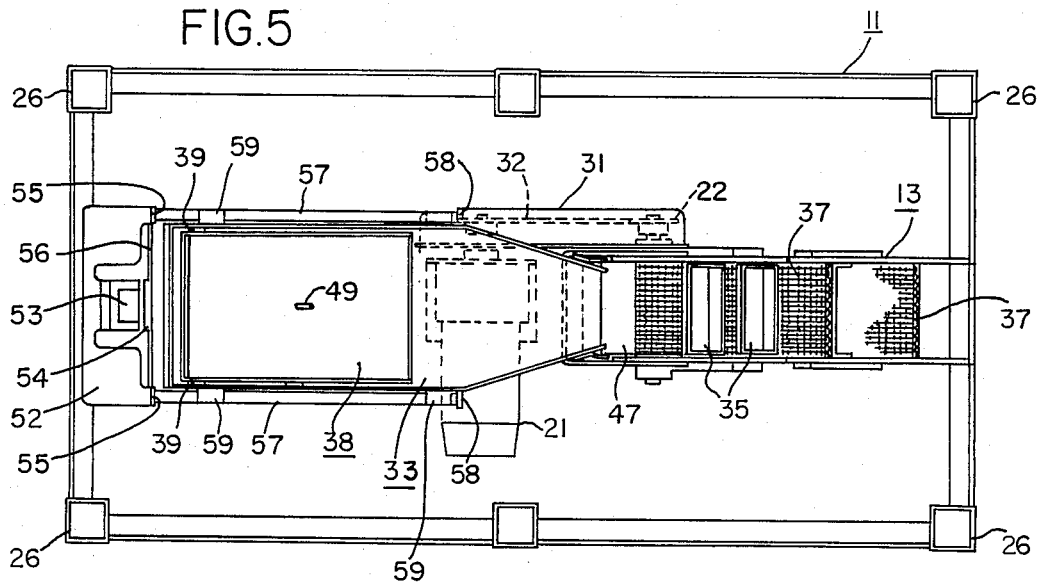
FIG. 5 is a sectional plan view taken along the lines 5—5 of FIG. 4.

As shown in FIG. 1, the device of the present invention is shown generally by the reference numeral 10. A rectangular boxlike structure 11 is mounted on castors 12 which are lockable so that the device can be positioned to align the discharge chute 14 to deliver small discrete objects such as pharmaceutical stoppers and caps to a receptacle 18, such as in a bottle capping machine. Discharge chute 14 also serves to support a belt conventional tensioning means 15 for adjusting the conveyor means 13. Adjustable arm 16 is extended outward to position a sensor means 17 for determining the amount of product contained in the receptacle 18.

Shown in FIG. 3 is a typical pharmaceutical stopper 19. This stopper 19 is broken away in part to show the true geometric configuration in section. These stoppers are often made from elastomers such as rubber. When they are sterilized, they often times are still wet when they are removed from the sterilization operation and transferred to the capping machine. One particular advantage of the present invention is that it allows for drying in a sterilized environment. Thus, stoppers such as 19 as they fall into receptacle 18 remain sterilized and have been subjected to a drying process, as will be described below.

The angularly displaced conveying means 13 is driven by a motor 21 connected through sprocket 22. As seen in FIG. 5, this motor 21 is completely enclosed. The sprocket 22 is fully enclosed by cover 31 and driven by chain 32. All of the lubrication and other contaminating components of the drive system are totally enclosed by the cover 31 to prevent contamination of the objects being transferred by the device. Operation of the electric motor 21 is controlled via control box 23 which is located on frame 11 above the motor 21 and sprocket 22. As shown in FIG. 2, the control box 23 includes several gauges and switches for easy and convenient operation by the operator.

The discrete objects which are being transferred by the elevator 13 are brought to the device in a hopper 24 which is a rectangular box set on top of frame 11. The hopper 24 has a truncated trapezoidal shaped delivery chute 25 from which the supply of stoppers 19 or other products are introduced into the device. While the rectangular box frame 11 is supported on legs 26 attached to lockable coasters 12, which lock the device in place so that it is suitably adjusted with respect to the receptacle 18. The hopper 24 may be removed when it is empty so as to permit an additional supply of stoppers or other objects to be introduced to the system. Handles 27 are provided to allow the operator to lift the empty hopper 24 from the device. The top 28 of the hopper 24 may be opened by pivoting face 28 about hinge 29, using the knob 30. More than one hopper can be used if necessary to keep the device in operation.

Once a hopper 24 has been placed into position on the frame 11, the chute 25 allows a quantity of objects to fall onto the delivery chute. The delivery chute includes a first tray 33 which is oscillated in the direction of arrow 34 shown in FIG. 4, to cause a product to travel to the open lower terminal end of tray 33 where they are picked up by bucket flights 35 and transferred up through the angularly displaced conveyor means 13.

Figure 6:
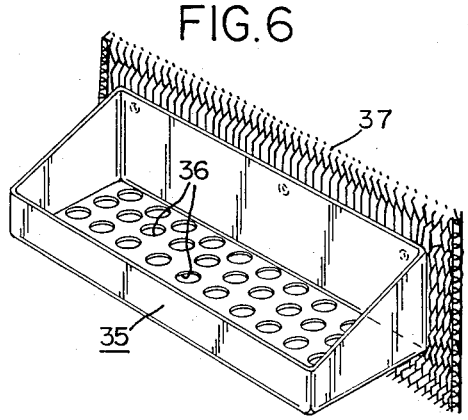
FIG. 6 is a fragmentary perspective view showing details of an individual flight and conveying belt as utilized in this device.

As shown in FIG. 6, the bucket flight 35 has a plurality of holes 36 which permit the passage of air during the transfer ride up the conveying means 13. This allows the warm sterile air in the sterile room to effectively dry the stoppers 19 or other products which might be contained in the bucket flight 35. The bucket flight 35 is attached to a chain conveyor belt 37 which is driven by sprocket 22 and motor 21. Motor 21, being a variable speed motor, can be adjusted to vary the rate of the travel of chain 37 to assist in regulation of the flow of stoppers from the hopper to the conveyor and then to the discharge chute.

Positioned within the tray 33 of the discharge chute is a second tray 38 which, like tray 33, is at an angle with respect to the horizontal. Accordingly, movement of the entire device in the direction of arrow 34, as shown in FIG. 5, causes the objects to move from the inner tray 38 out of the open lower terminal end thereof to fall onto the larger outer tray 33 and again out through the open lower terminal end onto the bucket flight 35.

The inner tray 38 is supported on outer tray 33 through connecting bolts 39. The angle that the tray 38 makes with respect to the tray 33 is shown in FIG. 10. The tray 38 is adjustably held in slot 41 through fastener 42 to position the bottom of the tray 38 with respect to the bottom of the tray 33 by an angle alpha. Alpha may range from zero when the axis 43 of tray 38 is parallel to the bottom of tray 33, such as when smaller stoppers such as 13 mm stoppers are being transported. When larger stoppers are being transported, such as 28 mm stoppers, the angle alpha between the tray 38 and the tray 33 is the largest. A median adjustment of bolt 42 in slot 41 for midway sized stoppers, such as 20 mm stoppers, places the axis of the tray 38 along line 45, in this case approximately halfway between axis 43 and 44. Thus, alpha will range from 0° to 10° or more.

The lower end 46 of tray 33 has a hinged plate 47 mounted, using bracket 48. As is clear from FIG. 4, the hinged plate 47 passes quite close to the bucket flight 35, so that objects being transferred by the tray 33 to the bucket flight 35 do not fall between the two elements. The bracket 48 may contain a hinge mechanism which allows the hinged plate 47 to rise in the event objects somehow become positioned between the hinged plate 47 and the edge of the bucket flight 35.

Figure 4:
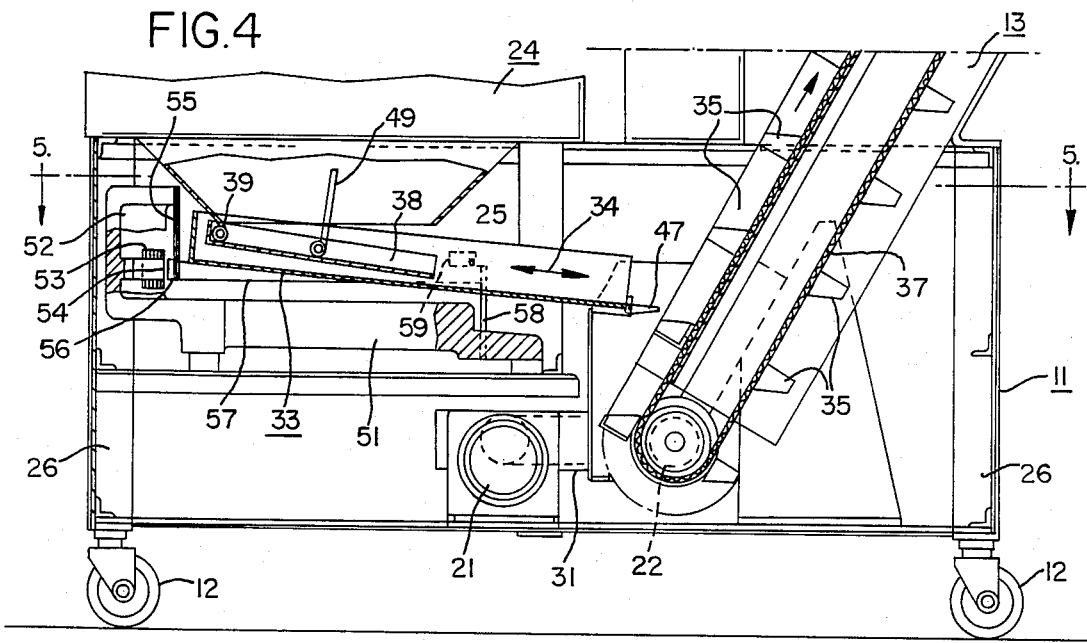
FIG. 4 is an enlarged fragmentary sectional side elevational view taken along line 4—4 of FIG. 2, showing additional details of construction.

Also shown in FIG. 4 is a rod 49 which is attached to the inner tray 38 and which moves when the trays 33 and 38 are oscillated in the direction of arrow 34. This vertically directed rod moves or stirs the small discrete objects contained in the truncated chute 25 to facilitate the flow of these objects.

Figure 5A:
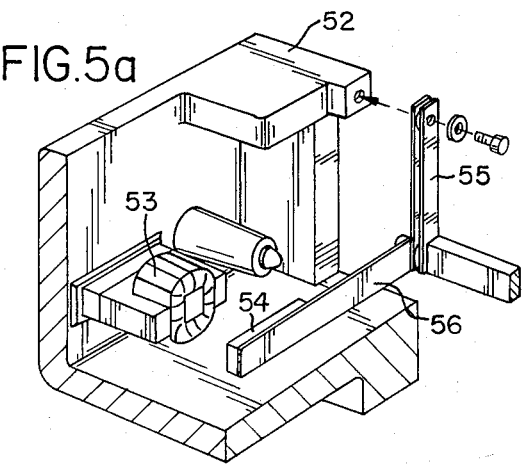
FIG. 5a is an exploded fragmentary perspective view illustrating details of the armature-coil structural arrangement.

As seen in FIG. 4, mounted on the rectangular boxlike structure 11 is a fixed mounting frame 51 which is a heavy metal casting capable of supporting the trays 33 and 38 as described hereinafter. An upper fixed frame member 52 supports a coil 53 in operating relationship with an armature 54 as illustrated in FIG. 5a. Armature 54 is held by double leaf spring 55 and a thin rod 56 which axially holds the armature. As can be seen in FIG. 5, the thin rod 56 is held by two double leaf springs 55 which extend from the top of the fixed frame 52 downwardly to the lower end and support the armature bar 54. These two double leaf springs 55 are tied to the foward end of two longitudinally extending parallel rectangularly cross sectioned bars 57 which have two additional springs 58 at their other ends. These springs 58 are also mounted in the fixed mounting frame 51. The outer tray 33 is mounted to the longitudinally extending bars 57 by block members 59. Thus operation of the coil 53 and armature 54 will cause the longitudinally extending bars 57 to oscillate as the current is cycled through the coil. This causes the tray 33, and the inner tray 38, to oscillate as well, in the direction shown by arrow 34. By varying the rate of oscillation, accurate control can be kept on the rate of transfer of the small discrete objects through the open end of tray 33 onto flights 35 of the conveyor elevator 13. As is seen in FIG. 5 as well, the end 46 of the tray 33 converges at the open lower terminal end adjacent the hinge plate 47 so that the objects are directed to the bucket flights 35.

An alternative embodiment of the present invention is shown in FIGS. 7 through 9. As shown in FIG. 9, the rectangular boxlike structure 11 contains the angularly displaced conveying means 13 and the control box 23. The frame 11 is held on legs 26 which are movably supported by castors 12. Castors 12, as noted above, can be locked to position the rectangular boxlike frame 11 in an appropriate place for discharging product. The structure of the delivery chute which takes the products from the hopper 24 to the conveyor 13 are not shown in FIGS. 7 through 9, for purposes of clarity, so that the particular details of this embodiment can be more clearly understood. A pair of vertically upstanding members 61 are provided with castors 62, and they are attached to supporting legs 63 whose terminal ends are provided with fixed or non-swivel rollers 64. These support legs 63 extend midway into the feeder assembly housing 11 and contain an indexing member 65 for locating the hopper 24 with respect to the rectangular frame 11. Thus, the operator can insert or remove the hopper 24 in the direction shown by arrow 66.

The hopper can also be raised or lowered in the direction shown by arrow 67 as the vertical upstanding members 61 support an outstanding arm 68 in combination with angle brackets 69. A roller slide assembly 71 is provided to prevent horizontal movement or rocking. The roller slide assembly 71 fits within a u-shaped rail assembly 72 which is opened at the bottom. Movable cross plate 73 is attached via wire 74 to a boss 75 which is centrally located. Boss 75 and plate 73 can be raised or lowered by wire 74 via pulley 76 and a winch and crank assembly 77. One advantage to this design is that the hopper may be a larger size since it no longer needs to be carried by one or two operators. Winch and crank assembly 77 can obviously be replaced by an electric motor, if that embodiment would be desired. The hopper and carrier system shown in this embodiment is filled with small discrete objects such as rubber stoppers, directly from a sterilizing unit as described above, and transported on castors 62 and fixed rollers 64. The roller slide assembly 71 fits into u-shaped rail 72 and the unit is brought into the rectangular boxlike frame 11 until index member 65 indicates that a proper alignment has been made. Index member 65 can conveniently interlock with leg 26, as shown in FIG. 8. At this point, the crank and winch assembly 77 is turned to lower the hopper 24 into position and the device is ready to operate.

Regardless of which assembly is used, either the movable hopper shown in FIGS. 7, 8 and 9 or the hopper shown with handles 27 in FIGS. 1 and 2, once the hopper 24 has been loaded with rubber stoppers or other discrete objects, the device is ready to dispense those objects to a receptacle such as receptacle 18.

In operation, the conveyor means 13 is started so that motor 21 drives chain 32 and sprocket 22 to cause the chain conveyor belt 37 to travel in a clockwise version, looking at FIG. 4. This causes the bucket flights 35 to rise as they pass hinged plate 47. Operation of the coil 53 and armature 54 causes the large tray 33 to vibrate in the direction shown by arrow 34. Smaller tray 38 also moves as it is fixedly mounted to outer tray 33. Vertical rod 49 extends into the truncated trapazoidal shaped delivery chute 25 of hopper 24 cause stoppers, for example, to fall into inner tray 38. Motion in the direction of arrow 34 imparts a straight line movement to the objects since the tray 38 is inclined at an angle with the horizontal.

Objects are fed from the tray 38 out its open lower terminal end onto the first or outer tray 33. Similarly, the objects are moved by the oscillatory motion of coil 53 and armature 34 to cause the objects to move down the inclined vertical face of tray 33 to tray 33's open lower terminal end. The end of tray 33 converges to the hinged plate 47 by means of side walls 46. Hinge plate 47 allows the objects to be placed on the porous bucket flights 35 where any residual moisture is dried in the sterile atmosphere of the clean room. These products are then carried up the conveyor 13 by chain 37 in bucket flights 35, to be deposited into the discharge chute 14. The belt tensioning means 15 is provided to allow some adjustment in the tension of the belt, to compensate for wear and for thermal expansion of the metallic parts.

The small objects such as stoppers fall from the discharge chute 14 into a receptacle 18, such as a feeding portion of a bottle capping apparatus. The level of product in the receptacle 18 is determined by a sensor 17 held by arm 16 so that a maximum limit can be sent. When the maximum limit is sensed, the vibrating coil and armature can be turned off, either automatically or upon operator reaction to a signal such as a warning light on control panel 23. As product no longer is moved by the vibrating coil and armature, product no longer fills the bucket flights and the receptacle 18 will not be over filled. Similarly, when the level in the receptacle 18 reaches a minimum or lower limit, a signal can be given, either by automatically activating the coil and armature or by another signal light notifying the operator that the vibration unit should be restarted.

Controls can be installed to prevent operation of the coil and armature vibrating apparatus when the elevator 13 is not in motion. Similarly, control limits can be installed to cause the motor 21 to stop driving the chain conveyor 37 after a given period of time has elapsed after the vibrating unit has stopped. This permits the stoppers in the chain to be emptied before shutting down the device. Alternatively, the motor 21 can be stopped as soon as the vibrating apparatus stops, thereby preserving a quantity of discrete objects in the various buckets 35. In this embodiment, the apparatus is ready to use as soon as the hopper has been refilled or when the sensor 17 indicates that a supply of product is desireable.

The entire device can be operated automatically, as illustrated in the electronic schematic shown in FIG. 11. Power is provided from a source 101 into terminal block 121. Sensor 103 provides a signal via control relay 119, once power is activated by switch 113 and pilot lamp 115. Motor control 117 engages drive motor 107. Vibrator coil 105 is activated by conventional feeder control 109, and indicator lamp 111.

While particular embodiments of the present invention have been illustrated and described herein, it is not intended to limit the invention and changes and modifications may be made therein within the scope of the following claims.

What is claimed is:

1. A device for transferring small discrete objects such as pharmaceutical stoppers and caps, comprising:
   a frame movably positionable at a predetermined location for delivery of said objects;
   an angularly displaced conveyor on said frame and having a discharge chute at said predetermined location for discharging objects thereto, said conveyor including a conveyor chain means defining a path from a transfer point to said discharge chute, said chain having bucket flight means for conveying said objects along said path;
   a delivery chute on said frame for transferring said objects to said transfer point, said delivery chute including a first tray inclined with respect to the horizontal and having an open lower terminal end adjacent said transfer point positioned to feed said objects to said conveyor chain, said delivery chute further including a second tray located within said first tray at the same or greater angle with the horizontal and positioned to receive said objects, said second tray having an open lower terminal end for feeding said objects to said first tray, said delivery chute further including vibrating means for oscillating said trays to impart movement of said objects toward the lower terminal ends of said trays; and
   hopper means removably mounted on said frame for holding a quantity of said objects including a hopper chute for gravity feed of said objects to said delivery chute.

2. The device of claim 1, wherein said frame includes locking castors for positioning said device at said predetermined location.

3. The device of claim 1, wherein said angularly displaced conveyor is driven by a drive mechanism which is sealed to prevent exposure of said objects to contamination.

4. The device of claim 1, wherein said objects are exposed to open air during travel along said path to permit ambient drying of said objects.

5. The device of claim 4, wherein said bucket flights include a plurality of perforations therein to permit passage of ambient air to said objects.

6. The device of claim 1, wherein said conveyor includes a sensor means for determining the height of product discharged from said discharge chute.

7. The device of claim 1, wherein said conveyor means further includes belt tensioning means for adjusting the tension on conveyor chain.

8. The device of claim 1, which further includes control means for adjusting the rate of said vibrating means to vary the rate of movement of said objects.

9. The device of claim 8, wherein said control means further controls the rate of travel of said conveyor chain.

10. The device of claim 9, wherein said controls are accessible on a control panel.

11. The device of claim 1, wherein all surfaces exposed to contact of said discrete objects are stainless steel.

12. The device of claim 1, wherein said hopper includes a top cover for enclosing the objects contained therein.

13. The device of claim 1, wherein the lower terminal end of said first tray includes a hinged plate adapted to deflect in the direction of travel of said bucket flight.

14. The device of claim 13, wherein said lower terminal end of said first tray includes converging side wall means for directing said objects to said hinge plate.

15. The device of claim 8, wherein said first tray is mounted on a plurality of leaf springs positioned to impart motion to said tray in a linear direction to and from said transfer point.

16. The device of claim 15, wherein said linear motion is imparted by an armature and coil means.

17. The device of claim 16, wherein said armature and coil means is controlled by said control means.

18. The device of claim 1, wherein said second tray is adjustable to increase its angle with respect to the horizontal.

19. The device of claim 1, wherein said second tray includes a vertically extending projection means extending into said hopper chute.

20. The device of claim 1, wherein said hopper is removable by an operator.

21. The device of claim 1, wherein said hopper is mounted on a detachable mobile frame.

22. The device of claim 21, wherein said detachable mobile mounting for said hopper includes alignment means for positioning said hopper with respect to said delivery chute.

23. The device of claim 1, wherein said frame includes a guide means for positioning said movable hopper.

24. The device for transferring small discrete objects such as pharmaceutical stoppers and caps comprising:
   a frame having locking castors and movably positionable at a predetermined location for delivery of said objects;
   an angularly displaced conveyor on said frame and having a discharge chute at a predetermined location for discharging objects thereto, said conveyor including a conveyor chain means defining a path from a transfer point to said discharge chute, said chain having bucket flight means including holes in said flights to convey said objects along said path while subjecting said objects to an ambient drying condition;
   a delivery chute on said frame for transferring said objects to said transfer point, said delivery chute including a first tray inclined with respect to the horizontal and having an open lower terminal end adjacent said transfer point, which end is positioned to feed said objects to said conveyor chain, said end including terminal plate means hinged to be deflected upon contact with objects carried by sid tray, said delivery chute further including a second tray located within said first tray at the same or greater angle with the horizontal and positioned to receive said objects, said second tray having an open lower terminal end for feeding said objects to said first tray, said first tray being mounted to said frame on a plurality of leaf spring means, and said delivery chute further including vibrating means for oscillating said trays to impart linear movement of said objects toward the lower terminal ends of said trays; and
   hopper means removably mounted on said frame for holding a quantity of said objects, including a hopper chute for gravity feed of said objects to said delivery chute.

25. The device of claim 24, wherein said angularly displaced conveyor is driven by a drive mechanism which is sealed to prevent exposure of said objects to contamination.

26. The device of claim 24, wherein said conveyor includes a sensor means for determining the height of product discharged from said discharge chute.

27. The device of claim 24, wherein said conveyor means further includes belt tensioning means for adjusting the tension on conveyor chain.

28. The device of claim 24, which further includes control means for adjusting the rate of said vibrating means to vary the rate of movement of said objects.

29. The device of claim 28, wherein said control means further controls the rate of travel of said conveyor chain.

30. The device of claim 28, wherein said linear motion is imparted by an armature and coil means.

31. The device of claim 30, wherein said armature and coil means is controlled by said control means.

32. The device of claim 1, wherein said second tray is adjustable to increase the angle with respect to the horizontal.

33. The device of claim 24, wherein said second tray includes a vertically extending projection means extending into said hopper chute.

34. The device of claim 24, wherein said hopper is removable by an operator.

* * * * *